United States Patent Office 2,727,054
Patented Dec. 13, 1955

2,727,054

METHOD OF PREPARING SILICATE ESTERS

James R. Wright, El Cerrito, Calif., assignor to California Research Corporation, San Francisco, Calif., a corporation of Delaware No Drawing. Application August 24, 1954,
Serial No. 451,985

5 Claims. (Cl. 260—448.8)

This invention relates to the production of silicate esters. More particularly, it concerns a new and improved process for the preparation of useful alkyl orthosilicates containing tertiary alkyl groups.

Silicate esters of the alkyl orthosilicate type are useful as hydraulic base fluids and lubricants for special applications. In general, their viscosity-temperature characteristics and low volatility are considered superior for such purposes, compared to mineral oils and other conventional materials for the transmission of power and specialty lubrication. Although many of the silicate esters suffer a serious disadvantage in being unstable in the presence of water which is often present in hydraulic systems, etc., it has been found that alkyl orthosilicates containing tertiary alkyl groups possess excellent hydrolytic stability characteristics.

Alkyl orthosilicates of the general type described above may be prepared by reacting a trialkoxychlorosilane with alkyl alcohol in the presence of an acid acceptor such as pyridine. When a tertiary alkyl alcohol is employed, the alkyl orthosilicate is provided with a tertiary alkyl group and possesses the improved properties noted above. Hydrogen chloride is formed in the reaction as a by-product and combines with the acid acceptor to give a solid salt such as pyridine hydrochloride.

In the case of ortho alkyl silicates containing tertiary alkyl groups, the above method is particularly unsatisfactory, since the hydrogen chloride formed in the reaction tends to dehydrate the tertiary alcohol, and this results in greatly reduced yields as well as the loss of valuable reactant. Another obvious disadvantage in the method lies in the fact that hydrogen chloride is highly corrosive, and the preparation must be carried out in special equipment. The acid acceptors employed are expensive, and this requires that the solid salt be separated and processed to recover the acid acceptor. Occlusion of the product on the solid salt further reduces the yield.

The number and types of tertiary alkyl groups which may be introduced into the ortho alkyl silicates by the above process are also limited to the tertiary alkyl alcohols which are available. The fact that most of these are low molecular weight type alcohols makes it necessary to increase the size of the alkyl groups of the alkyl orthosilicate in order to maintain low volatility, and this invariably causes an undesirable decrease in the viscosity index or increase in viscosity-temperature curve slope of the material.

I have now found that superior alkyl orthosilicates containing tertiary alkyl groups may be conveniently prepared in excellent yields by a process which comprises reacting a trialkoxysilanol having alkoxy radicals of 2 to 12 carbon atoms each with a tertiary alkyl primary amine of 4 to 12 carbon atoms in the presence of a base catalyst, and separating the tertiary alkyl orthosilicate thus formed.

The yields of tertiary alkyl orthosilicate obtained in accordance with the process of my invention as already mentioned are excellent. No by-product hydrogen chloride is formed to decompose the reactants. The necessity for expensive corrosion-resistant equipment is avoided. An acid acceptor of the type such as pyridine is not required in the process, thus avoiding substantial losses of product by occlusion on the solid hydrogen chloride salt formed by the acid acceptor. This also eliminates the need for expensive separation and recovery steps, as well as unhealthful conditions attendant to the use of such hazardous chemicals as pyridine and the like. Furthermore, by the present process an increased variety of higher molecular weight tertiary alkyl groups are made available for the production of low volatility orthosilicates having excellent viscosity-temperature relationships and hydrolytic stability. These properties make them especially suitable as hydraulic base fluids and specialty lubricants, such as instrument oils, ice machine oils, and machine gun lubricants.

The trialkoxysilanols employed in the process as stated above, contain from 2 to 12 carbon atoms in each of the alkoxy radicals. They may be represented by the following structural formula:

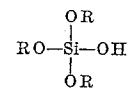

in which R is an alkyl group of 2 to 12 carbon atoms. The alkyl groups may be the same or may differ from one another in respect to structure and carbon content. Preferred silanols are those characterized by secondary or tertiary alkyl groups containing 4 to 8 carbon atoms each.

Trialkoxysilanols of the above type are well known in the art, and may be readily prepared by first reacting silicon tetrachloride with an alcohol of the desired alkyl structure to produce the corresponding trialkoxychlorosilane, which may then be reacted with ammonia and water, as described in detail in Example 1 below, to give the trialkoxysilanol. Representative trialkoxysilanols which are suitable for the process of the present invention includes triethoxysilanol, ethoxy di(2-octoxy) silanol, triisopropoxysilanol, 2-butoxy diisopropoxysilanol, tri(2-butoxy)-silanol, tert. butoxy di(2-butoxy)silanol, tri(4-methyl-2-pentoxy)silanol, tri(2-heptoxy)silanol, tri(2-octoxy)-silanol, tri(3-decoxy)silanol, tri(cyclohexoxy)silanol, tri-(4 - methylcyclohexoxy)silanol, tri(5 - ethyl - 2 - nonoxy)-silanol, 2-butoxy di(2-dodecoxy)silanol, and tri(2-dodecoxy)silanol.

The tertiary alkyl primary amines which are employed in the process contain from 4 to 12 carbon atoms, as already mentioned. They constitute a source of higher molecular weight tertiary alkyl groups not available heretofore in processes restricted to the use of tertiary alkyl alcohols. Preferred tertiary alkyl amines for present purposes contain from 4 to 10 carbon atoms, since they are more available and impart the highest degree of hydrolytic stability without sacrifice of desirable viscosity-temperature characteristics in the final alkyl orthosilicate product. Illustrative tertiary alkyl amines of this type include tert. butyl amine and tert. octyl amine.

The base catalyst of the process, in accordance with the invention, may be an inorganic or organic base. Suitable catalysts include sodium hydroxide, potassium hydroxide and various alcoholates such as sodium methoxide, sodium isopropoxide, sodium ethoxide, aluminum trimethoxide, and aluminum triisopropoxide. The organic bases, as illustrated by the class of sodium methoxide, potassium methoxide, sodium ethoxide, sodium isopropoxide, and aluminum trimethoxide, are presently preferred. Only catalytic amounts are necessary in the process. Ordinarily, from about 0.01 to 1.0 mol per cent, based on the total number of mols of trialkoxysilanol present, is preferred.

The process proceeds in a straightforward manner, and may be simply carried out by mixing the trialkoxysilanol and the tertiary alkyl amine in equimolar proportions in the presence of the catalyst. In a preferred embodiment, a molar excess of the tertiary alkyl amine is employed, up to 50%, to completely react the trialkoxysilanol, since excess tertiary alkyl amine may be recovered for further use in accordance with the process of the invention.

Although the reaction proceeds at ordinary temperatures, mild heating with temperatures above about 100° F., but not above 400° F., is preferred to accelerate the reaction. For present purposes, temperatures of 150 to 350° F. are most satisfactory, since they are easiest to maintain and require no special apparatus.

The reaction is complete when ammonia is no longer evolved. Time intervals as short as 0.5 to 1 hour are sufficient for the reaction. However, reaction periods of about 5 to 20 hours are preferred for highest yields.

Pressures are not critical to the reaction. Atmospheric pressure is preferred to facilitate removal of ammonia produced in the reaction. However, superatmospheric pressures may be employed when necessary to avoid the loss of unusually volatile reactants.

It may also be desirable to strip the reaction mixture with an inert gas such as nitrogen. This provides more efficient removal of the ammonia. Such a process, after removal of the base catalyst, leaves a product composed predominantly of tertiary alkyl orthosilicate which may be used as such, without further purification, as in hydraulic base fluid or lubricant of superior quality.

Although the product may require little or no purification, as noted above, it is usually preferred to remove unreacted materials and separate the reaction products by standard procedures such as stripping, fractional distillation, etc.

In further illustration of the process according to this invention, as described above, the following examples are submitted. Unless otherwise specified, the proportions are given in parts by weight.

EXAMPLE 1

In this example tri(2-butoxy)silanol was prepared. A two-liter flask equipped with a stirrer, dropping funnel and reflux condenser was charged with 510 grams (3 mols) of silicon tetrachloride. An ice-salt bath was employed to maintain the temperature below about 25° F. throughout the operation. 666 grams (9 mols) of 2-butanol was then added over a two-hour period. After this, the cooling bath was removed and nitrogen bubbled through the liquid to remove the HCl formed. The stripped reaction mixture was distilled under a vacuum equal to about 2 mm. of mercury pressure, and 730 grams (2.6 mols) of tri(2-butoxy)-chlorosilane was recovered as a fraction boiling between about 167 and 172.5° F.

339 grams (1.2 mols) of the above product was charged to a three-liter flask equipped with stirrer and reflux condenser along with 800 cc. of n-hexane. Ammonia was passed through the mixture for about four hours, during which time the temperature rose to about 113° F. A sudden drop in temperature indicated the end of the reaction. The liquid products, comprising tri(2-butoxy)silamine, were combined with an excess of water. The mixture was stirred for about one hour. The aqueous phase was then separated and the desired oil layer washed with water, after which it was dried and the hexane solvent removed under reduced pressure to give the tri(2-butoxy)silanol in an essentially quantitative yield as a fraction boiling between 196 and 199.5° F. at 3.5 mm. mercury pressure.

EXAMPLE 2

In this example, tri(2-butyl)tertiary butylsilicate was prepared. To a one-liter reaction flask equipped with mechanical stirrer and reflux condenser there was charged 133 grams (0.5 mol) of tri(2-butoxy)silanol. 40 grams (0.55 mol) of tertiary butylamine was then added to the xylylol and the two reactants remixed. Following this, one gram of sodium methoxide catalyst was added to the reactants. A slight increase in temperature occurred at this point, and mild evolution of ammonia was observed, indicating progress of the reaction. The temperature was raised slowly over a five-hour period to 195° F., which is the reflux temperature of the tertiary butylamine. Nitrogen was passed through the system to sweep out the ammonia formed.

When the reaction was complete, as indicated by ammonia no longer being evolved, the product was allowed to cool to 77° F. After cooling, the liquid product was subjected to vacuum distillation at a pressure equal to about 5 mm. mercury and 117 grams of tri(2-butyl) tertiary butylsilicate was obtained as a plateau cut. This yield amounted to a 73.2% conversion. The product had the following properties:

Boiling point _____ 248° F./5 mm.
Refractive index ($N_D^{20}$) _____ 1.4075
Viscosity, cs. at:
    210° F. _____ 0.911
    100° F. _____ 2.01
    −40° F. _____ 18.34
    −65° F. _____ 41.89

The chemical analysis of the product was as follows:

| | Calculated | Found |
|---|---|---|
| Silicon, percent | 8.75 | 8.74, 8.75 |
| Nitrogen | 0.0 | 0.05, 0.06 |
| Carbon | 60.0 | 59.77, 59.72 |
| Hydrogen | 11.25 | 11.18, 11.23 |

EXAMPLE 3

This example relates to the preparation of tri(2-octyl)-tertiary butylsilicate. In the equipment described in Example 2, above, there was reacted 86.4 grams (0.2 mol) of tri(2-octoxy)silanol and 16 grams (0.22 mol) of tertiary butylamine in the presence of 1 gram of sodium methoxide catalyst. The reactants were stirred for about 20 minutes at room temperature, during which there was a slight increase in temperature and a mild evolution of ammonia. Following this, the temperature was increased to 190° F., where it was maintained for about 3½ hours.

The product obtained in the above reaction was allowed to cool. It was then fractionated to yield the tri-(2-octyl)tertiary butylsilicate as a fraction boiling between 363 and 367° F. at 0.2 mm. mercury pressure. This material had the following physical properties:

Boiling point _____ 363–367° F./0.2 mm.
Refractive index ($N_D^{20}$) _____ 1.4338
Viscosity, cs. at:
    210° F. _____ 2.00
    100° F. _____ 6.46
    −40° F. _____ 370.3
    −65° F. _____ 1559

The chemical analysis of the product was as follows:

| | Calculated | Found |
|---|---|---|
| Silicon, Percent | 5.74 | 5.39, 5.43 |
| Nitrogen, Percent | 0.0 | 0.05 |

The superior properties of the tertiary alkyl orthosilicates prepared in accordance with the process of this invention are effectively illustrated by the results of a series of tests which were carried out to determine their hydrolytic stability. In these tests 3 ml. portions of the orthosilicates to be tested were combined with 3 ml. of distilled water in a small glass vial equipped with a reflux condenser. A ¼-inch piece of clean copper wire was added as catalyst. The vial and contents were placed on a hot plate, where they were heated to 212°

F. and were maintained at that temperature for the duration of the test. Progressive decomposition stages are evidenced by (1) haze formation, (2) formation of precipitate, and (3) gel formation. Materials giving clear aqueous and silicate phases for at least 48 hours in the test will satisfy U. S. Air Force specifications for hydrolytic stability of hydraulic fluid. Results of the test are as follows:

*Table*

| Compound | Hours | Appearance | |
|---|---|---|---|
| | | Silicate Phase | Aqueous Phase |
| Tri(2-butyl)tertiary butylsilicate | 624 | Clear | Clear. |
| Tri(2-octyl)tertiary butylsilicate | 700 | ...do... | Do. |

As illustrated by the above test results, tertiary alkyl orthosilicates prepared in accordance with the improved process of the invention are characterized by remarkable stability in the presence of water. This property is particularly desirable for hydraulic fluids and lubricants, as previously mentioned. It is a distinct advantage of the present invention that such superior materials can be economically prepared from an increased variety of reactants in substantially enhanced yields, while at the same time avoiding depreciation of quality.

I claim:

1. A process which comprises reacting a trialkoxysilanol having alkoxy radicals of 2 to 12 carbon atoms each with a tertiary alkyl primary amine of 4 to 12 carbon atoms in the presence of a base catalyst.

2. A process for preparing alkyl orthosilicates containing tertiary alkyl groups which comprises reacting a trialkoxysilanol having alkoxy radicals of 2 to 12 carbon atoms each with a tertiary alkyl primary amine of from 4 to 12 carbon atoms in the presence of a base catalyst, and separating the tertiary alkyl silicates.

3. A process for preparing alkyl orthosilicates containing tertiary alkyl groups which comprises mildly heating an equimolar mixture of a trialkoxysilanol having alkoxy radicals of 2 to 12 carbon atoms each and a tertiary alkyl primary amine of 4 to 12 carbon atoms in the presence of a base catalyst until ammonia is no longer evolved, and separating the tertiary alkyl silicates.

4. A process for preparing alkyl orthosilicates containing tertiary alkyl groups which comprises reacting a trialkoxysilanol having alkoxy radicals of 2 to 12 carbon atoms each with a tertiary alkyl primary amine of 4 to 12 carbon atoms at 150 to 300° F. for about 5 to 20 hours in the presence of an organic base catalyst, and separating the tertiary alkyl orthosilicates.

5. A process for preparing alkyl orthosilicates containing tertiary alkyl groups which comprises reacting a trialkoxysilanol having alkoxy radicals of 2 to 12 carbon atoms each with a tertiary alkyl primary amine of 4 to 12 carbon atoms at 150 to 300° F. for about 5 to 20 hours in the presence of an organic base catalyst, sweeping out the ammonia formed with an inert gas, and separating the tertiary alkyl orthosilicates.

No references cited